United States Patent [19]

Harkless et al.

[11] Patent Number: 4,527,055
[45] Date of Patent: Jul. 2, 1985

[54] APPARATUS FOR SELECTIVELY VIEWING EITHER OF TWO SCENES OF INTEREST

[75] Inventors: Lloyd B. Harkless, Londonderry, N.H.; William L. McCracken, Wayland; Joseph A. Colosimo, Lexington, both of Mass.

[73] Assignee: Honeywell Inc., Minneapolis, Minn.

[21] Appl. No.: 441,572

[22] Filed: Nov. 15, 1982

[51] Int. Cl.³ ............................................... G02B 27/17
[52] U.S. Cl. ...................... 250/234; 350/6.7; 358/109; 358/206
[58] Field of Search ................................ 250/234–236, 250/203 R, 334; 350/171, 6.5, 6.7, 6.8, 6.9; 244/3.16–3.18; 358/206, 109, 113; 354/65

[56] References Cited
U.S. PATENT DOCUMENTS

| 3,121,165 | 2/1964 | Astheimer et al. | 250/203 R |
| 3,211,046 | 10/1965 | Kennedy | 350/171 |
| 3,637,281 | 1/1972 | Gull | 350/6.7 |

Primary Examiner—Edward P. Westin
Attorney, Agent, or Firm—John S. Solakian; Laurence J. Marhoefer

[57] ABSTRACT

Either of two scenes of interest may be detected by use of a scanning sensor having a rotatable polygonal scanning mirror coupled to receive incident radiation from such scenes of interest. Apparatus is included for directing such incident radiation onto a detection device. A movable shutter is coupled to block receipt by the mirror of radiation from the first scene of interest when the second scene of interest is viewed, and vice versa.

13 Claims, 7 Drawing Figures

APPARATUS FOR SELECTIVELY VIEWING EITHER OF TWO SCENES OF INTEREST

The Government has rights in this invention pursuant to Contract No. F33615-80-C-1029 awarded by the Department of the Air Force.

BACKGROUND OF THE INVENTION

The present invention relates generally to scan mechanisms for imaging systems, and, more particularly, those used in combined downward and forward looking infrared line scanners.

Infrared Line Scanners ("IRLS") for downward viewing from aircraft are well-known and are routinely used for aerial reconnaissance and for earth resources studies. Similarly, Forward Looking Infrared Line Scanners ("FLIRS") are also well known, and are commonly used as reconnaissance or night vision devices. In other applications, for example reconnaissance from a remotely piloted or autonomously guided vehicle, it is often necessary to provide the means of viewing in either the downward or forward direction depending on the immediate mission requirements. In such vehicles it is also often necessary to point the line of sight of the sensor or scanner in a particular direction, and to stabilize that line of sight against motions due to either aircraft maneuver, undesirable vibration or buffeting motions which commonly occur during flight. Currently, FLIR sensors are available which provide stabilization and pointing relative to the aircraft axes.

Where both downward and forward looking capabilities are necessary on the same aircraft, a single sensor/scan mechanism is most desirable since space and weight are limited on such aircraft. However, a single sensor generally cannot be simply gimbal-mounted such that the sensor is slued from forward to downward looking mode. First, it may take too long to slue the sensor from one line of sight to another. Second, the fields of view of either sensor type are generally incompatible. For example, the small rectangular field of view of a FLIR would not be particularly useful in a downward viewing mode where wide across track or horizon to horizon coverage typically provided by an IRLS sensor are most desirable.

It is accordingly a primary object of the present invention to provide an improved electro-optical scanning mechanism capable of selectively viewing either of two scenes of interest and which uses a common optical path and common elements to minimize sensor size, weight, cost and complexity.

A further object of the present invention is to provide such a scanning sensor which can be easily switched from one viewing mode to another in a minimum amount of time and with minimum sensor motion.

It is a further object of the present invention to provide a sensor capable of rapid and efficient stabilization in one axis (for example, in the aircraft pitch axis) without the need of gross motion of the entire sensor, thereby further reducing system complexity, weight and cost.

SUMMARY OF THE INVENTION

These and other objects of the present invention are achieved by providing an electro-optical, split-image, mechanically scanned sensor which has, for example, the capability of selectively viewing either downward, as in an IRLS, or forward, as in a mechanically scanned television camera or FLIR. The optional selection of either viewing mode is achieved by selection of an appropriate pair of reflecting facets on a multi-sided polygonal (e.g. square) prismatic spin mirror whose function is to provide the main sensor scanning motion by means of its uniform rotation about its longitudinal axis of symmetry. The viewing mode may be changed rapidly without the need for sensor motion by movement of a shutter positioned about the spin mirror. When the lower spin mirror facets are selected, the sensor scans a line transverse to the line of flight, as in a downward looking IRLS sensor. At such time, the upper reflecting facets of the spin mirror are blocked from receipt of radiation by means of the shutter. When it is desired to view in the forward direction, the shutter is moved such that the bottom pair of spin mirror facets are enclosed, and the upper facets are exposed to radiation entering the sensor from the forward direction. Radiation entering the sensor from the forward direction is reflected downward onto the upper facets of the spin mirror by means of a flat tilted elevation scan mirror located directly over the spin mirror.

Because of the nominally ninety (90) degree optical fold at the elevation scan mirror, the transverse scanning motion of the sensor line of sight is converted into a nominally aximuthal scan transverse to the vehicle's line of flight. The orthogonal scan required to provide the rectangular field of view ("frame") usually desired in television type cameras and FLIR scanners is provided by an appropriately timed scan of the elevation scan mirror which nods about its transverse axis to deflect the sensor line of sight up or down as required.

The present invention has the advantage that a change in viewing mode can be accomplished in less than one second, such that loss of data during changeover is minimized. This is particularly important in high speed missile or aircraft applications in which the time available for data collection may last only a few seconds. In addition, the use of common servo systems, and common spin and fold mirrors reduces system complexity and increases overall reliability. A further advantage of the present invention is that it is possible to use a common means of optical detection and associated electronics where desirable. For example, in an infrared imaging system, it is possible to use a common infrared detector array and common detector electronics channels. Different or equal instantaneous fields of view may be achieved in each mode by appropriate signal processing.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENT(S)

Figure 1A:
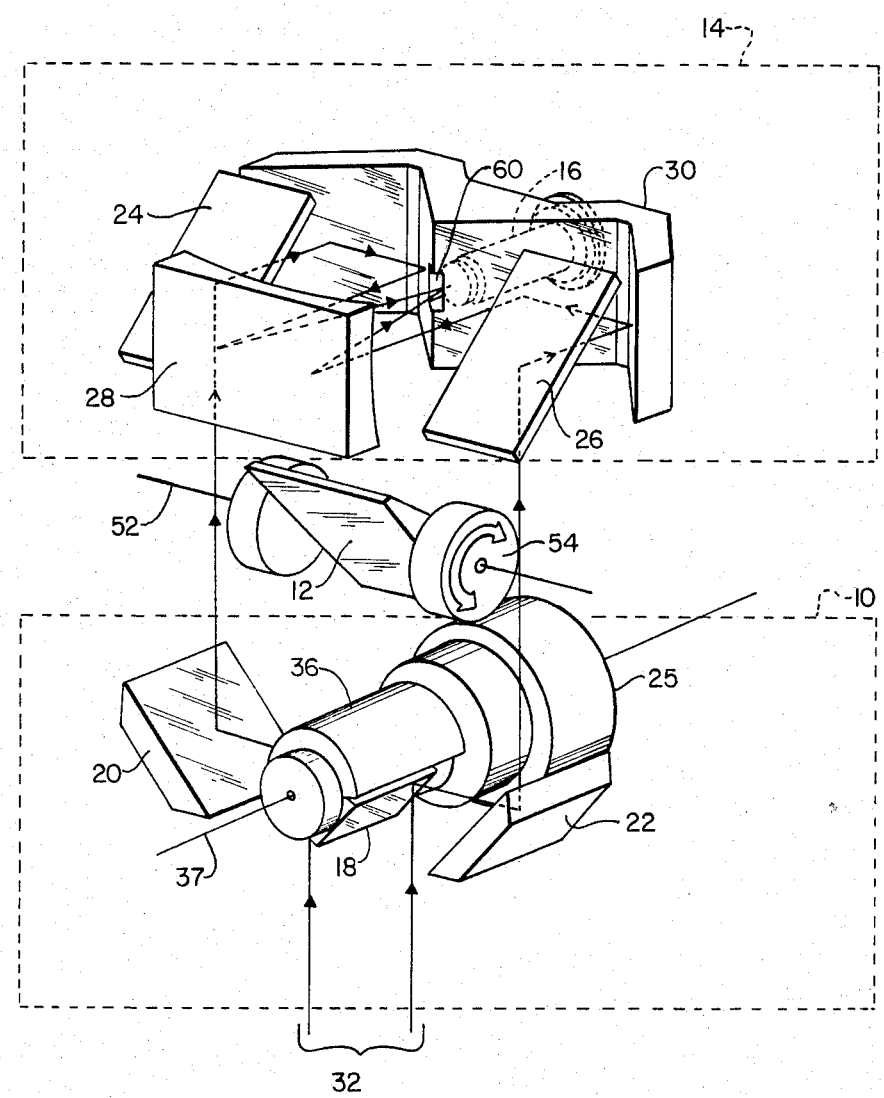
FIGS. 1A and 1B show isometric views of the subject invention in downward and forward modes, respectively.

Referring to FIGS. 1A, 1B, 2A and 2B, the apparatus of the present invention includes a split field line scan mechanism 10, in combination with a tiltable elevation scan mirror 12, common light collecting optics 14 (flat mirrors 24 and 26, focusing mirror 28, and "W"-mirror 30), optical detection device 16, and shutter 36. In one embodiment, split field scan mechanism 10 includes a rectangular prismatic spin mirror 18, a device 25 for controlling the speed and rotation of mirror 18, and planar fold mirrors 20 and 22.

In an alternate embodiment, scan mechanism 10 might include some other prismatic spin mirror, for example a triangular prismatic mirror, and an arrangement of other curved or flat folding mirrors as necessary to create a split-field scan. Possible configurations of such mechanisms are described in U.S. Pat. No. 3,211,046, H. V. Kennedy, "Split Image, High Scanning Rate Optical System with Constant Aperture."

Figure 2A:
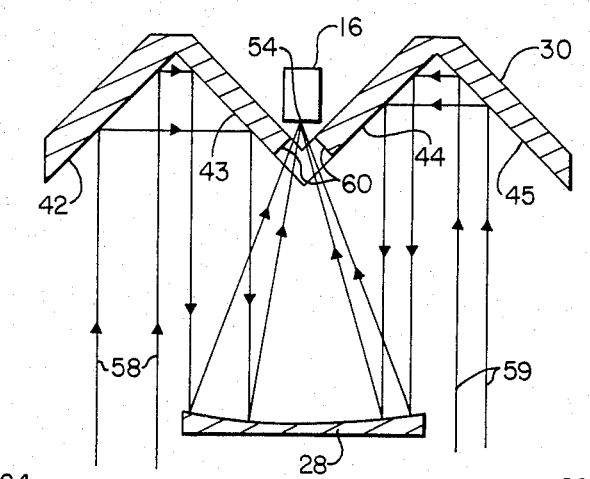
FIGS. 2A and 2B show schematic top (partial) and front views, respectively, of the subject invention in the downward looking mode.
Figure 2B:
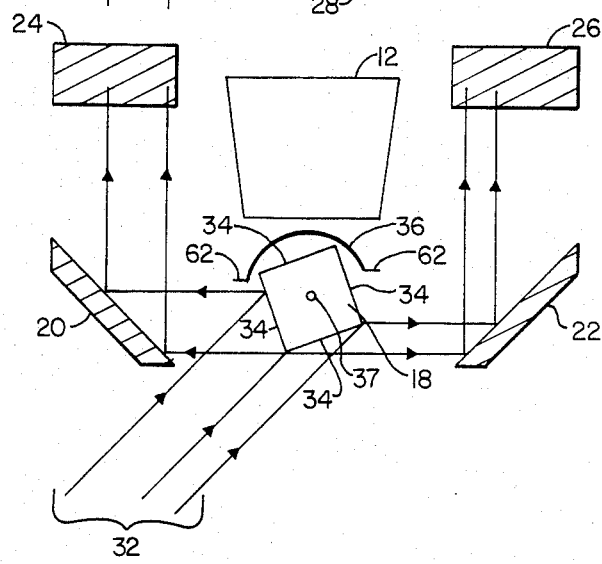

As shown in FIGS. 1A and 2B, mirror 18 rotates about axis of symmetry 37 creating a wide field of view scan of the scene beneath the scanner. Light rays 32 from the scene of interest are reflected by substantially flat facets 34 of mirror 18, onto fold mirrors 20 and 22 into optical recombination and focusing optics 14. Optics 14 recombines the two light bundles from mirrors 20 and 22 into a common energy bundle to be measured by optical detection device 16. As mirror 18 rotates, adjacent mirror facets 34 split light rays from the scene such that the amount of energy reflected off each facet onto either fold mirror 20 or 22 vary, but both the instantaneous field of view of the scanner and the total collected energy of the system remain substantially the same throughout each scan.

Figure 4:
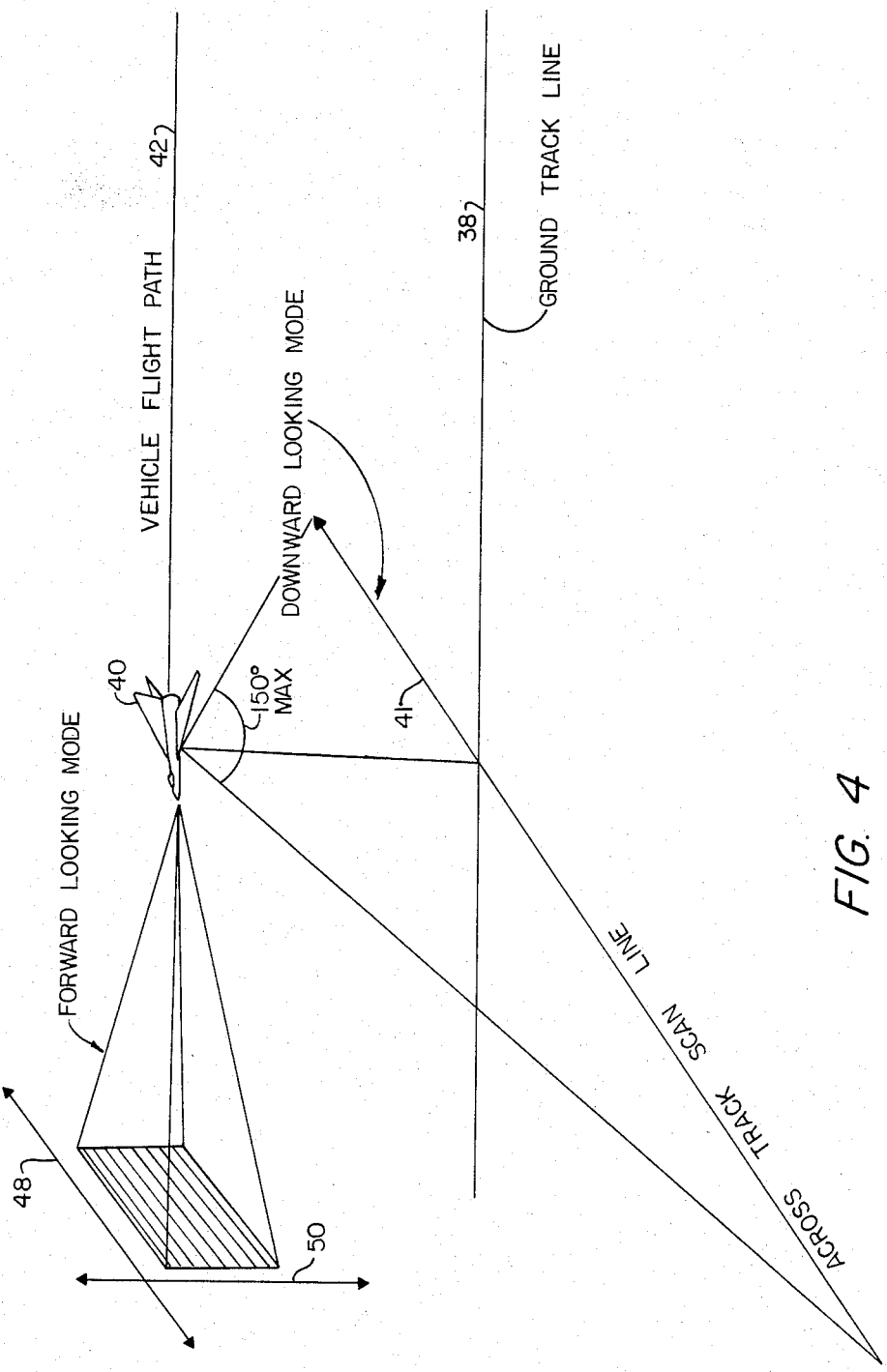
FIG. 4 shows alternate scanning modes of the present invention.

In the downward looking mode as shown in FIGS. 1A and 4, motion of the spin mirror 18 about its axis 37 creates an across track scan; approximately a 150 degree scan parallel to axis 41 across the ground track line 38 created by vehicle 40. Motion of vehicle 40 along its line of flight 42 creates the scan in the orthogonal direction.

In the embodiment shown, optics 14 comprises a group of substantially flat fold mirrors 24 and 26 with flat facets 42, 43, 44, and 45 of "W"-mirror 30 in combination with parabolic focus mirror 28 which provide a reduced overall system volume while directing optical rays 32 around elevation mirror 12 onto detection device 16. In an alternate embodiment, optics 14 might comprise any combination of flat or curved mirror segments necessary to recombine rays 32 along a substantially common optical axis onto an optical detector, for example a television camera or infrared detector array.

Figure 1B:
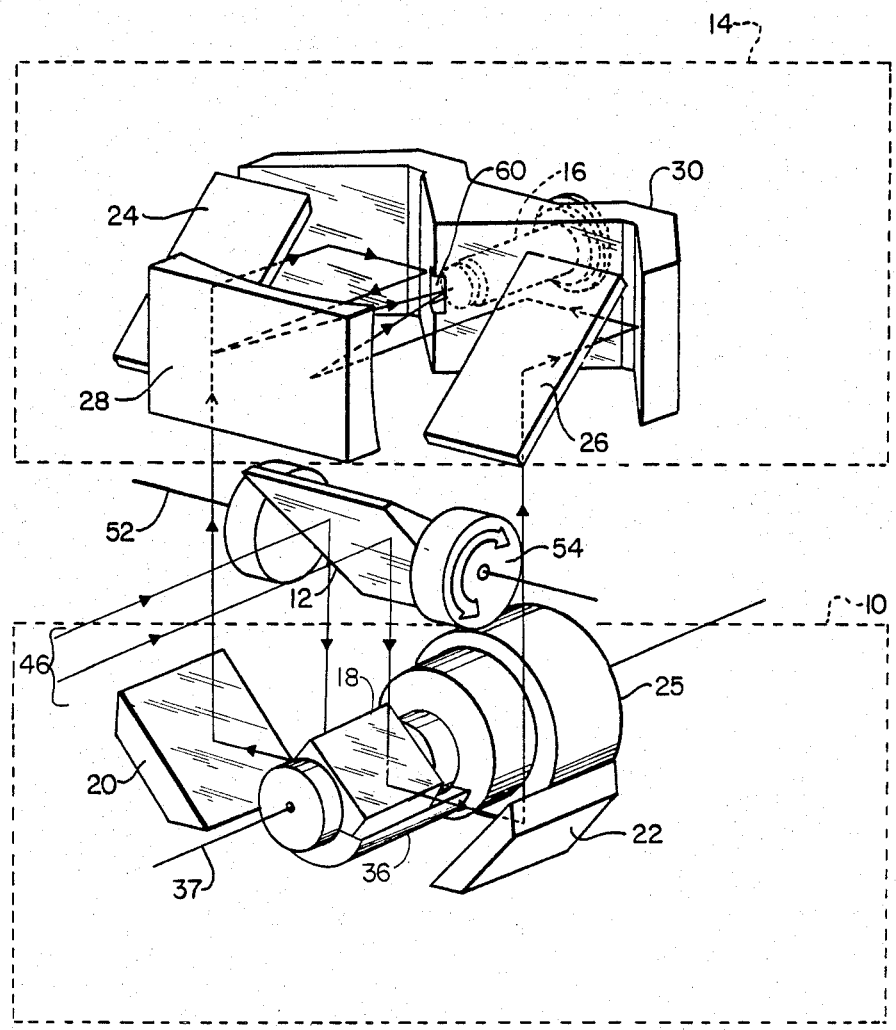
Figure 3A:
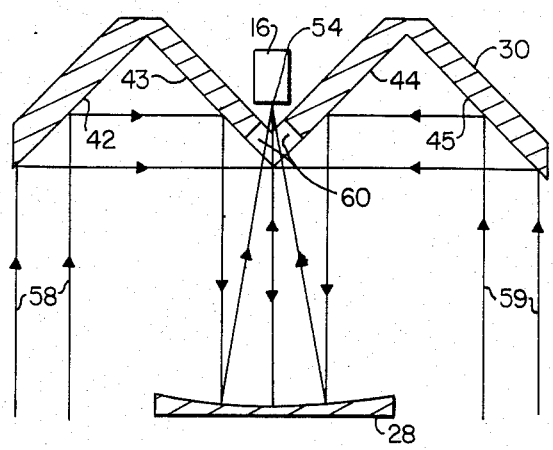
FIGS. 3A and 3B show schematic top (partial) and front views, respectively, of the subject invention in the forward looking mode.
Figure 3B:
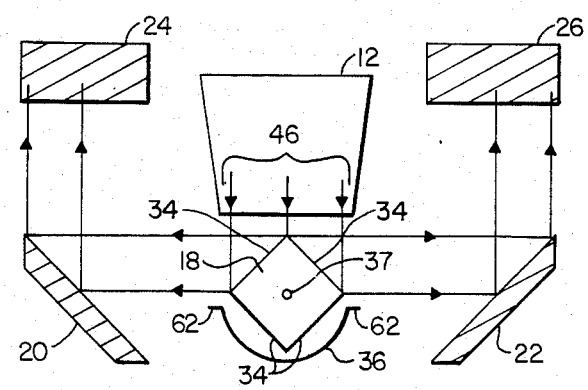

To view in the forward looking mode, as shown in FIGS. 1B, 3A and 3B, shutter 36 is moved about common spin mirror axis 37 such that the lower facets of mirror 18 are blocked from receipt of radiation from below, and the upper facets of spin mirror 18 are exposed. In one embodiment, shutter 36 comprises a thin opaque and lightweight hemi-cylinder which encloses approximately half of spin mirror 18 at any given time. Appropriate flanges or lips 62 may be placed on the shutter to reduce stray light entry into the optical system. In alternate embodiments, the two viewing modes may be separately controlled by blocking appropriate portions of the transmitted split beams from the scan mirror by use of combinations of leaf, plate or curtain shutters known in the art, which need not be placed directly around the spin mirror 18.

The width of the field of view in the forward mode is controlled by the width of mirror 12 in conjunction with the size of facets 34 of spin mirror 18. Increasing the width of mirror 12 (measured parallel to axis 52) will increase the width of the frame as measured along axis 48. The width of the mirror 12 is effectively limited by the amount of tolerable vignetting of the scanned optical beams and by system volume, packaging and scanning windows constraints.

In the forward mode, as shown in FIG. 3B, light rays 46 from a scene in front of the sensor are folded by mirror 12 onto spin mirror 18 which, in concert with fold mirrors 20 and 22 and optics 14, act as a second split field scanner which utilize substantially common optical elements. However, by virtue of the reflection of rays 46 off mirror 12, the rotation of spin mirror 18 results in an azimuthal (along the horizon) scan parallel to axis 48 as shown in FIG. 4.

Elevation scan in the orthogonal direction, parallel to axis 50, is achieved by rotation of mirror 12 about axis 52 by control device 54, which may include a motor, encoder device and associated servo system. If required, other motion sensing devices, such as rate gyroscopes, may be used to determine the amount of vehicle pitch caused by, for example, aircraft maneuvers, vibration or buffeting. In combination with other servo systems these motion sensors may provide additional drive signals to elevation mirror 12 so that the image recorded by detection device 16 is not blurred by aircraft motion.

It should be noted that all optical elements of the subject invention are common to both modes of operation, with the exception of elevation scan mirror 12, which is used only in the forward looking mode. However, as shown in FIGS. 2A, 2B, 3A, and 3B, the optical paths traversed by rays 32 and 46 are, in part, different since, in the downward looking mode rays 32 enter the common optical system from the lower facets of spin mirror 18, and in the forward looking mode rays 46 enter from the upper facets of spin mirror 18. Thus, fold mirrors 20 and 22 are proportionally larger than those typically used in the simple split-field scan mechanism. For example, as shown in FIG. 2B, rays 32 which reflect off lower facets 34 of spin mirror 18 strike the lower segments of fold mirrors 20 and 22 and are reflected to the inner portions of fold mirrors 24 and 26. As shown in FIG. 3B, rays 46 reflected off mirror 12 into the common optical train are reflected off the upper facets of spin mirror 18 to the upper portions of fold mirror 20 and 22, as shown in FIG. 3B. These rays strike the outer portions of fold mirrors 24 and 26, as shown.

"W"-mirror 30 comprises four substantially flat mirror faces placed at substantially 90 degree angles in the shape of a "W," as shwon in FIG. 3A to effectively reduce the displacement between optical paths 58 and 59 so as to reduce the size of focusing mirror 28. It is understood that the combination of fold mirrors 20, 22, 24, 26 and mirror facets 42, 43, 44 and 45 are shown only by way of example, and that any other suitable arrangement of optical elements to recombine and focus the split optical image might also be used. In the described embodiment, focusing mirror 28 comprises a parabolic mirror which focuses rays 46 or 32 through hole 60 in "W"-mirror 30 to optical detection device 16.

In the operation of the present invention, an optical detector 16, or transducer of optical energy to electrical energy, is employed such that, at the point of focus 54 of optics 14, the scanned optical image is converted into one or more channels of time varying electrical signals representing the scene. In practice, the detection device 16 will most often include an array of infrared detectors, for example a focal plane array or assembly. In many applications the focal plane array will be cryogenically cooled by means and techniques well known to the art. The electrical output of the detector is then available for further analog and digital processing.

In some applications the output signals from detection device 16 may be digitized for computer processing before presentation on a video display or other digital processing equipment. It is understood that in the embodiment and application of the present invention, the individual detector elements in a focal plane array may be comgined with one another in various ways to synthesize larger instantaneous fields of view, or to synthesize appropriate image sampling patterns. It is also understood that these individual and combined signal channels may be filtered and amplified using appropriate analog electronics, and that further appropriate signal processing may occur after the signal channels have been converted to digital signals by means of analog-to-digital converter circuits.

In aircraft-mounted forward looking sensors it is important to stabilize the line of sight of the sensor against unwanted movement caused by pitch motions of the aircraft. In the present invention this stabilization may be achieved by providing an additional drive signal to the elevation scan mirror drive motor which produces an appropriate deflection of the elevation scan mirror so as to correct the sensor line of sight for the pitch excursion.

It is also desirable to be able to point the sensor line of sight in various directions during flight while it is in the forward looking mode. In the present invention, the motion required in the pitch axis may be accomplished by application of a third drive signal to the elevation scan mirror drive motor so as to produce the required pitch axis deflection of the sensor line of sight. Yaw and roll axis stabilization and pointing are accomplished by mounting the entire sensor in yaw and roll gimbals as is commonly done. Therefore, the sensor of the present invention may be stabilized in three axes (pitch, yaw and roll) while viewing in the forward looking mode, and in two axes (yaw and roll) while viewing in the downward looking mode.

Having described the invention, what is claimed as new and novel and for which it is desired to secure Letters Patent is:

1. An apparatus for detecting radiation received from either a first or a second scene of interest, said apparatus comprising:
   A. polygonal scanning spin mirror means coupled to receive said radiation;
   B. means for detecting said radiation received by said mirror means; and
   C. shutter means coupled to block said radiation from either said first or said second scene of interest from being received by said detection means.

2. Apparatus as in claim 1 wherein said shutter means is selectively coupled to block either said radiation from said first scene of interest or said radiation from said second scene of interest.

3. Apparatus as in claim 2 wherein said first scene of interest is in a direction substantially forward of said apparatus and wherein said second scene of interest is in a direction substantially ninety (90) degrees from said first scene of interest.

4. Apparatus as in claim 1 in which said shutter means comprises a single movable shutter positioned about said mirror means such that in one position said shutter blocks said radiation from said first scene of interest from being received by said mirror means, and in an alternate position said shutter blocks said radiation from said second scene of interest from being received by said mirror means.

5. Apparatus as in claim 4 in which said mirror means is coupled to rotate about a rotation axis, and wherein said shutter comprises a substantially hemi-cylindrical movable drum whose axis of symmetry is substantially coincident with said rotation axis of symmetry of said mirror means, such that when said shutter is rotated about said rotation axis into a first position, said mirror means is blocked from receipt of radiation from said first scene of interest, and when said shutter is rotated into a second position, said mirror means is blocked from receipt of radiation from said second scene of interest.

6. Scanning sensor apparatus for sensing incident radiation received from either a first scene of interest or a second scene of interest, said first scene of interest different in direction from said second scene of interest, said apparatus comprising:
   A. split field scanning means having
      (i) polygonal scanning mirror means coupled for rotation about a first axis, said scanning mirror means coupled to split said incident radiation from said first desired scene of interest into at least two beams;
      (ii) means, coupled to receive said at least two beams from said polygonal scanning mirror means, for reflecting said at least two beams,
      (iii) means, coupled to receive said at least two beams from said means for reflecting for recombining said at least two beams along a substantially common axis, and
      (iv) means, coupled to receive said at least two beams from said means for recombining, for focussing said at least two beams onto a desired point;
   B. first movable mirror means coupled with said scanning mirror means such that said incident radiation from said second scene of interest may be reflected onto said scanning mirror means and through said split field scanning means to said desired point;
   C. means for blocking said incident radiation from either said first scene of interest or said second scene of interest such that only said incident radiation from the said scene of interest not so blocked enters said split field scanning means; and
   D. detection means positioned at said desired point for measuring the incident radiation received by said split field scanning means from either said first or said second scene of interest.

7. Apparatus as in claim 6 in which said polygonal scanning mirror means comprises a four-sided scan mirror whose cross section is substantially square.

8. Apparatus as in claim 6 in which said focusing means comprises at least one segment of a parabolic mirror.

9. Apparatus as in claim 6 in which said means for blocking comprises a single movable shutter means positioned about said scanning mirror such that in one position said shutter means blocks incident radiation from said first scene of interest from entering said scanning means, and in an alternate position said shutter means blocks incident radiation from said second scene of interest from entering said scanning means.

10. Apparatus as in claim 9, wherein said mirror means includes a plurality of facets, in which said shutter means comprises a substantially hemi-cylindrical movable drum whose axis of symmetry is substantially coincident with said first axis of said scanning mirror means, such that when said shutter means is rotated about said first axis into a first position, substantially one-half of the facets of said mirror means are blocked from receipt of radiation from said first scene of interest, and when said shutter means is rotated into a second position, substantially one-half of said facets of said mirror means are blocked from receipt of radiation from said second scene of interest.

11. Apparatus as in claim 10 in which said shutter means includes flange means for reducing stray light reflected from said scanning mirror means from entering said detection means.

12. Apparatus as in claim 6 in which at least one folding mirror is inserted in at least one of said at least two beams such that the optical path length of both of said beams are substantially equal, so that said at least two beams may be directed to minimize the overall volume of said apparatus.

13. Apparatus as in claim 6 in which said recombining means comprises "W-shaped" mirror means having four mirrored facets at substantially ninety (90) degree angles to each other about a single axis of symmetry such that when said at least two beams substantially parallel to said axis of symmetry impinge on the outer facets of said "W-shaped" mirror means, said at least two beams are reflected to and off the inner facets of said "W-shaped" mirror means substantially parallel to said axis of symmetry, and such that the distance between said at least two beams, measured perpendicular to said axis of symmetry, is reduced.

* * * * *